(12) United States Patent
Pechacek et al.

(10) Patent No.: US 10,725,774 B2
(45) Date of Patent: Jul. 28, 2020

(54) ISSUE TRACKING SYSTEM

(71) Applicant: ATLASSIAN PTY LTD, Sydney (AU)

(72) Inventors: Taylor Pechacek, Sydney (AU); Seung Yeon Sa, Sydney (AU); Jachin Sheehy, Wentworthville (AU); André Van Der Schyff, Cremorne (AU); Dmitry Pak, Cremorne (AU); Adriaan Fenwick, Heathcote (AU); Bruce Alec Templeton, Randwick (AU)

(73) Assignee: ATLASSIAN PTY LTD, Sydney, New South Wales (AU)

( * ) Notice: Subject to any disclaimer, the term of this patent is extended or adjusted under 35 U.S.C. 154(b) by 0 days.

(21) Appl. No.: 16/100,100

(22) Filed: Aug. 9, 2018

(65) Prior Publication Data

US 2019/0303139 A1 Oct. 3, 2019

Related U.S. Application Data

(60) Provisional application No. 62/650,930, filed on Mar. 30, 2018.

(51) Int. Cl.
| | |
|---|---|
| *G06F 3/0481* | (2013.01) |
| *G06F 3/0482* | (2013.01) |
| *G06F 8/36* | (2018.01) |
| *G06Q 10/10* | (2012.01) |
| *G06F 8/71* | (2018.01) |
| *G06Q 10/02* | (2012.01) |
| *G06Q 10/06* | (2012.01) |

(52) U.S. Cl.
CPC .............. *G06F 8/71* (2013.01); *G06F 3/0482* (2013.01); *G06F 3/04817* (2013.01); *G06F 8/36* (2013.01); *G06Q 10/02* (2013.01); *G06Q 10/0631* (2013.01); *G06Q 10/103* (2013.01)

(58) Field of Classification Search
CPC ...... G06F 3/0482; G06F 8/71; G06F 3/04817; G06F 8/36; G06Q 10/02; G06Q 10/0631; G06Q 10/103
See application file for complete search history.

(56) References Cited

U.S. PATENT DOCUMENTS

| | | | |
|---|---|---|---|
| 6,850,891 B1 * | 2/2005 | Forman ................ | G06Q 10/063 705/7.11 |
| 8,135,612 B1 * | 3/2012 | Scudder ................ | G06Q 10/02 705/7.14 |

(Continued)

*Primary Examiner* — Ziaul A Chowdhury
(74) *Attorney, Agent, or Firm* — Hickman Palermo Becker Bingham LLP

(57) ABSTRACT

An issue tracking system (ITS) is disclosed. The ITS comprises a user interface configured to receive user input defining one or more issues and an interface module configured to interface with a source code management system (SCM) and receive from the SCM, data pertaining to linked SCM-repository events. The received data is processed to generate an order for the SCM-repository events to which the issue is linked. A display module is configured to concurrently display a plurality of issues, each issue being displayed with issue information and issues having linked SCM-repository events being displayed with linked SCM-repository event information, said linked SCM-repository event information being displayed according to the generated order.

8 Claims, 10 Drawing Sheets

(56) References Cited

U.S. PATENT DOCUMENTS

| | | | | |
|---|---|---|---|---|
| 8,341,590 | B1* | 12/2012 | Poole | G06F 8/71 717/101 |
| 10,162,740 | B1* | 12/2018 | Setty | G06F 11/3672 |
| 2003/0046308 | A1* | 3/2003 | Weber | G06Q 30/02 |
| 2006/0015850 | A1* | 1/2006 | Poole | G06F 8/71 717/120 |
| 2009/0313059 | A1* | 12/2009 | Trivedi | G06Q 10/06 705/301 |
| 2012/0022949 | A1* | 1/2012 | George | G06Q 10/103 705/14.66 |
| 2012/0272205 | A1* | 10/2012 | Fox | G06F 8/36 717/101 |
| 2013/0006689 | A1* | 1/2013 | Kinnear | G06Q 10/06 705/7.16 |
| 2013/0346506 | A1* | 12/2013 | Zimmerman | G06Q 10/06 709/205 |
| 2014/0236649 | A1* | 8/2014 | Hamid | G06Q 10/103 705/7.11 |
| 2015/0277708 | A1* | 10/2015 | Rodrig | G06F 3/0485 715/777 |
| 2016/0274997 | A1* | 9/2016 | Kachko | G06F 11/366 |
| 2016/0321069 | A1* | 11/2016 | Chen | G06F 8/75 |
| 2017/0091208 | A1* | 3/2017 | Quan | G06F 3/0482 |
| 2018/0210728 | A1* | 7/2018 | Bhamidipaty | G06F 8/77 |
| 2018/0261305 | A1* | 9/2018 | Lindblad | G16H 10/20 |

* cited by examiner

ISSUE TRACKING SYSTEM

BENEFIT CLAIM

This application claims the benefit under 35 U.S.C. § 119(e) of provisional application 62/650,930, filed Mar. 30, 2018, the entire contents of which are hereby incorporated by reference for all purposes as if fully set forth herein.

TECHNICAL FIELD

The present disclosure generally relates to improved systems, methods, computer software and hardware in the field of issue tracking systems (ITS). The disclosure relates more specifically to an issue tracking system that includes modules for integrating with source code management systems.

BACKGROUND

The approaches described in this section are approaches that are known to the inventors and could be pursued. They are not necessarily approaches that have been pursued. Therefore, unless otherwise indicated, it should not be assumed that any of the approaches described in this section qualify as prior art merely by virtue of their inclusion in this section, or that those approaches are known to a person of ordinary skill in the art.

Generally speaking, an ITS is a system used to manage work items or "issues". Example ITSs include JIRA, JIRA Service Desk and JIRA Software which are commercially available from Atlassian Pty Ltd., Sydney, Australia. ITSs are deployed in a wide variety of applications including organizational support, customer call centers and for software development teams to use in project management and bug tracking. When deployed for software development projects, an ITS may be used with other systems, such as 'source code management systems', also known as 'revision control' or 'version control systems'. These are used to track and manage computer program source code as the code is written and revised. For readability, the acronym "SCM" will be used in place of "source code management", and although SCM systems are predominantly used to track source code they can be used to track other data.

Examples of SCM systems include systems such as MERCURIAL, GIT and Bitbucket, commercially available from Atlassian Pty Ltd. Generally speaking, SCM systems store data—typically source code—in repositories and facilitate access to that data from multiple different client systems. In order to work on a project, a user, using a client system, creates a local copy of the relevant data, e.g. program source code, from a repository and works on that local copy. If the user makes changes that are to be incorporated into the remote version of the data, the user's local copy of the data—or at least those portions that have been changed—is written back to the repository using the SCM system. The SCM system controls access to the repository data and also manages version control for the data.

SCM systems typically manage and track numerous documents/source code files across multiple repositories and for numerous users. These documents/files managed by SCM systems can be changed frequently as users add new documents/files, delete documents/files, and make changes to existing documents/files.

ITSs and SCMs are separate systems that provide independent functionality. In certain cases they can communicate with each other, however it would be advantageous to achieve a tighter and more seamless integration between the two systems.

SUMMARY

The appended claims may serve as a summary of the invention.

DESCRIPTION OF EXAMPLE EMBODIMENTS

Figure 1:
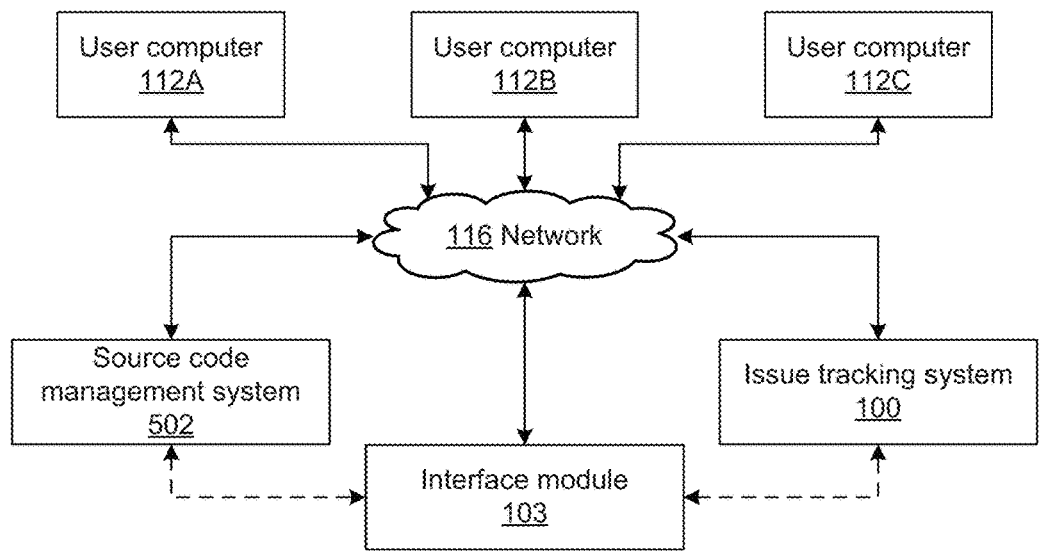
FIG. 1 is a schematic illustration of an integrated ITS and SCM suitable for use with the present disclosure.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form to avoid unnecessarily obscuring the present invention. Embodiments are described in sections according to the following outline:

1. OVERVIEW
2. EXAMPLE SYSTEM IMPLEMENTATION
3. ISSUE TRACKING SYSTEM
4. ISSUE TRACKING SYSTEM DISPLAY
5. SOURCE CODE MANAGEMENT SYSTEM
6. ITS/SCM COMMUNICATIONS
7. HARDWARE OVERVIEW

1. Overview

Computer-implemented techniques are provided for interfacing between an ITS and a SCM. In one embodiment, a link is created between an issue of the ITS and one or more repository events of the SCM. Data pertaining to linked repository events is received from the SCM. The received data is processed to generate an order for the repository events to which the issue is linked. A plurality of issues is concurrently displayed, each issue being displayed with issue information and issues having linked SCM-repository events being displayed with linked repository event information, said linked repository event information being displayed according to the generated order. In an embodiment, the order is generated according to an order of importance of the SCM-repository events within the SCM. In an embodiment, the SCM-repository events include one or more: commits, branches; open pull requests; declined pull requests, and merged pull requests. In an embodiment, the order is generated according to an order of importance of the SCM-repository events. In an embodiment, pull requests are superior in the order to branches and commits. In an embodiment, the display of the plurality of issues displays a single issue on a card and concurrently displays the plurality of issues as a plurality of cards laid out in a grid-like pattern. In an embodiment, the grid-like pattern includes one or more columns of cards each column relating to an issue category. In an embodiment, issues having linked SCM-repository events are displayed in a manner to be visually distinct from issues without linked SCM-repository events. In an embodiment, the visual distinction is drawn by displaying a development status indicator to represent the linked SCM-repository event information. In an embodiment, the development status indicator is defined in, and common to, the SCM. In an embodiment, the display of the plurality of issues displays further information about the linked SCM-repository event in response to a user interaction with the linked SCM-repository event information. In an embodiment, the further information includes a numerical value indicating a quantity of the linked SCM repository events.

Other embodiments, aspects and features will become apparent from the disclosure as a whole.

2. Example Computer System Implementation

FIG. 1 illustrates, at a high level of generality, the systems involved in implementing the embodiments described herein. In broad terms, the embodiments include an ITS 100 and an SCM system 502, further details of which are provided below.

Both systems 100 and 502 provide their respective services to user computers 112, typically over a network 116. Although illustrated as if housed at a single location, skilled addressees will realize that ITS 100 and SCM System 502 can be implemented at a locally-hosted computing facility or using distributed, cloud-based data center infrastructure. Depending on the implementation environment, network 116 can be a local area network or the Internet.

As described in further detail below, SCM system 502 maintains repositories of source code files and other materials pertaining to individual software development projects. In the course of developing a project using an SCM, users of user computers 112 take certain actions with respect to a repository that result in events occurring in the SCM system. Information about these SCM-repository events is stored in the repository along with the other information that is necessary for the SCM system to document revisions made to the source code files as well as the general course of development of the project.

In addition to communicating with user computers 112, ITS 100 and SCM system 502 are also in communication with each other by way of an Interface Module 103. Interface Module 103 is illustrated in FIG. 1 as a unit that is separate to ITS 100 and SCM system 502. However, skilled addresses will realize that the module could be integrated either at the software or hardware level into the ITS 100 and is described as such below. Communication between the SCM system 502 and ITS 100 occurs over network 116 or other suitable channels depending on the respective network locations of the two systems.

As described in further detail below, the present embodiment involves operating the ITS 100 and Interface Module 103 to retrieve development status information from the SCM 502 system. The retrieved information is processed according to a display methodology and into a suitable form for integration into the ITS workflow and display for end use.

3. Issue Tracking System

As noted above, an ITS is a system used to manage work items or "issues". An ITS may be provided using a variety of different architectures. As an example, a client server architecture is described below in which the ITS functionality is provided by a server computer and accessed by users from user computers.

Figure 2:
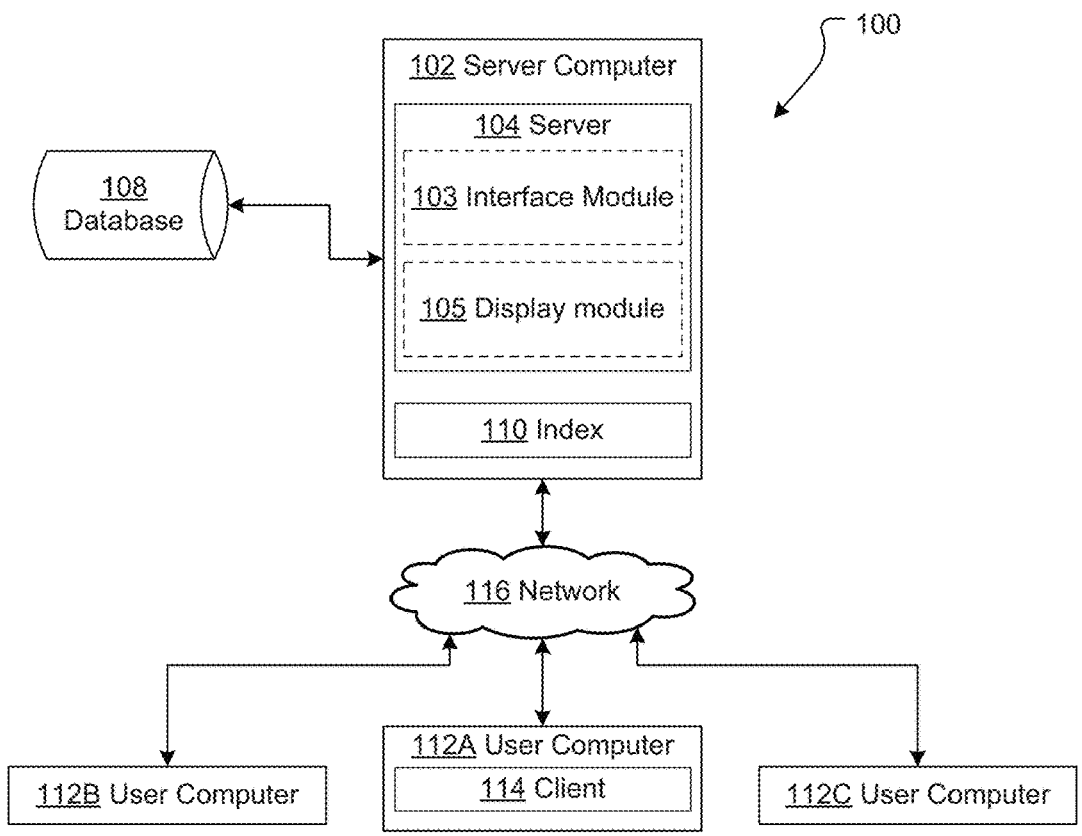
FIG. 2 illustrates a client server architecture for an ITS suitable for use with the present disclosure.

FIG. 2 illustrates a single server implementation of an ITS 100. ITS 100 comprises a server computer 102. Server computer 102 hosts an ITS server 104 for providing server-side ITS functionality. The ITS server 104 comprises one or more application programs, libraries, APIs or other software elements that implement the features and functions that are further described herein.

Server computer 102 also stores or has access to ITS data. ITS data generally includes: ITS metadata defining the operation of the ITS, for example, issue type definitions, issue workflows, user permissions and the like; and issue data, i.e. data in respect of issues that have been entered into, and are being maintained by, the ITS. In this example ITS data is stored on and managed by a database 108, though it could be alternatively stored, for example on a local file system of the server computer 102. Database 108 is provided by a database server which may be hosted by server 102, but will more typically be hosted on a separate physical computer in communication, directly or indirectly via one or more networks, with ITS server computer 102.

Interface module 103 is illustrated in FIG. 2 as being integrated into ITS Server 104, however it will be noted that the module could be implemented as a separate unit elsewhere in the network. As described below, Interface module 103 is configured to retrieve development status information from SCM system 500. The retrieved information is then processed in accordance with a methodology so as to be suitably integrated into the various workflows created on the ITS 100.

As noted above, ITS 100 also comprises a user computer 112. ITS user computer 112 hosts an ITS client 114 which provides client-side ITS functionality. A display module 105 included on ITS Server is configured to generate displays of the ITS data on user computers 112 in accordance with the routines programmed into server computer 102. A user interface is also displayed on client computers 112 for receiving user input, such as to define issues and workflows.

An ITS client 114 may be a general web browser application, such as, for example, Chrome, Safari, Internet Explorer, Opera. In this case the client 114 accesses the ITS server 104 via an appropriate uniform resource locator (URL) and communicates with the ITS server 104 using general world-wide-web protocols, e.g. http, https, ftp. The web browser application is configured to request, render and display electronic documents that conform to a markup language such as HTML, XML or extensions, and may be capable of internally executing browser-executable code such as JAVASCRIPT, VB Script, or other forms of code. Where the ITS client 114 is a web browser, the ITS server 104 will be a web server, such as, for example, Apache, IIS, nginx, GWS.

Alternatively, the ITS client 114 may be a specific application programmed to communicate with server 102 using defined application programming interface (API) calls. In this case the ITS server 104 will be a specific application server configured to interact with the ITS client application.

A user computer 112 may host more than one ITS client 114, for example a general web browser client and a specific application client. Similarly, server computer 102 may host more than one ITS server 104.

The ITS server computer 102 may serve multiple user computers 112, or, more specifically, multiple ITS clients 114. In FIGS. 1 and 2, three user computers have been depicted 112A, 112B, and 112C, though more or fewer could be used.

The server computer 102 and client computer 112 communicate data between each other either directly or indirectly through one or more communications networks 116. Communications network 116 may comprise a local area network (LAN) of an enterprise in one embodiment. In this case ITS 100 may be implemented as an on-premises solution in which the server computer 102 and user computer 106 are associated with the same business enterprise and at least the server computer 102 is within an enterprise-controlled facility that is protected from open internetworks using firewalls or other security systems. In another embodiment, network 116 may represent a public internetwork and the server computer 102 may be located off-premises with respect to an organization, such as in a shared data center or cloud computing facility.

While a single server client-server architecture has been described above, an ITS may be implemented using alternative architectures. For example, in certain cases a clustered architecture may be used where multiple server computing instances or nodes are instantiated to meet system demand. Conversely, in the case of small enterprises with relatively simple requirements an ITS may be a stand-alone implementation, i.e. a single computer directly accessed/used by the end user.

The type(s) of issues handled by an ITS can vary greatly depending on the scenario in which the ITS is implemented. In a software development scenario, however, "issues" may for example be bugs, features currently under development, and/or features intended for future development. Many alternative implementations and types of issues are possible.

In order to manage issues, an ITS maintains metadata, for example in a relational database, which defines various operational parameters. ITS metadata can include, for example: one or more issue type definitions, each issue type definition defining a field scheme or field configuration for issues of that type, e.g. the possible fields or data to be maintained by the ITS for issues of a given type; one or more workflow definitions, a workflow definition defining the workflow that applies to an issue of a particular type, e.g. the states an issue can take and the manner in which an issue transitions between those states over its lifecycle; and user permissions, e.g. which users may create issues, view issues, amend issues, change the states of issues etc. In some cases the ITS may allow the user to change the metadata—e.g. to define new/different issue types, issue type definitions, and/or workflows.

The actual fields defined with respect to an issue type will depend on the requirements of a given ITS implementation. By way of example an issue type definition may define the following fields: a project field storing a project to which an issue belongs; a key field storing a unique identifier for an issue; a description field storing a description of an issue and actions taken with respect to the issue; a status field indicating the stage an issue is currently at in its lifecycle; an assigned person field indicating who, if anyone, an issue has been assigned to; a severity field storing the severity of an issue, e.g. critical, major, minor, etc.; a priority field storing the priority of an issue at a general level, e.g. very high, high, medium, low, very low; and a rank field storing a rank value in respect of an issue, defining a rank order of the issue relative to other issues.

In order to create and progress issues in ITS 100 users interact with appropriate user interfaces provided by an ITS client 114. For example, a user may create a new issue and provide relevant information in respect of the issue, e.g. a particular project the issue is associated with, a description, a priority, any other relevant information catered for. The ITS 100 itself will typically generate an issue key that can be used to uniquely identify the issue, which may be hidden from or visible to the user. Once an issue has been created a user can interact with it, for example by adding additional information to the issue, e.g. in an issue description or other field, changing the state of the issue, e.g. from in progress to resolved, assigning the issue to another person, e.g. by changing an assigned person field.

4. Issue Tracking System Display

Figure 3:
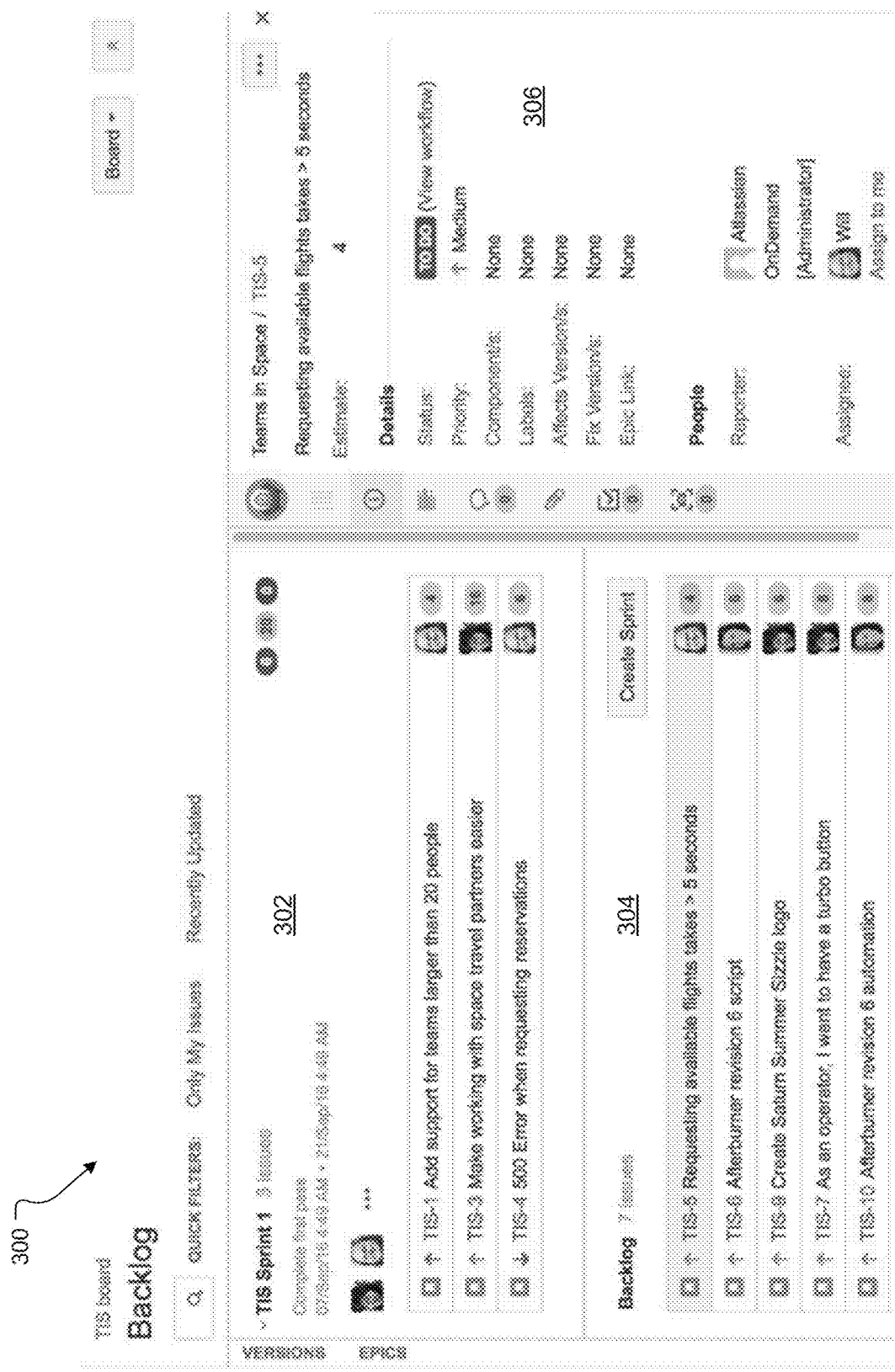
FIGS. 3 and 4 illustrate examples of typical user interfaces generated by an ITS.

In some instances, the user interface generated by an ITS is in the form of a 'Board', that displays issues from one or more projects. Boards provide a flexible way for users to view, manage, and report on work in progress. An example of a Board is illustrated in FIG. 3. Board 300 shows the issues for a project divided into a backlog 304 and sprints 302, although Boards can be customized into a wide range of settings. A sprint is a fixed time period where teams complete work on the issues in backlog 304. Additional detail about an issue in sprints 302 or backlog 304 is available in a detail section 306. Amongst other actions, backlog issues can be created and updated, dragged and dropped in order to apply a ranking, or assigned to sprints. For issues already assigned to sprints, these can be created and updated and dragged and dropped to different locations on the Board in order to transition the issue through a workflow.

Figure 4:
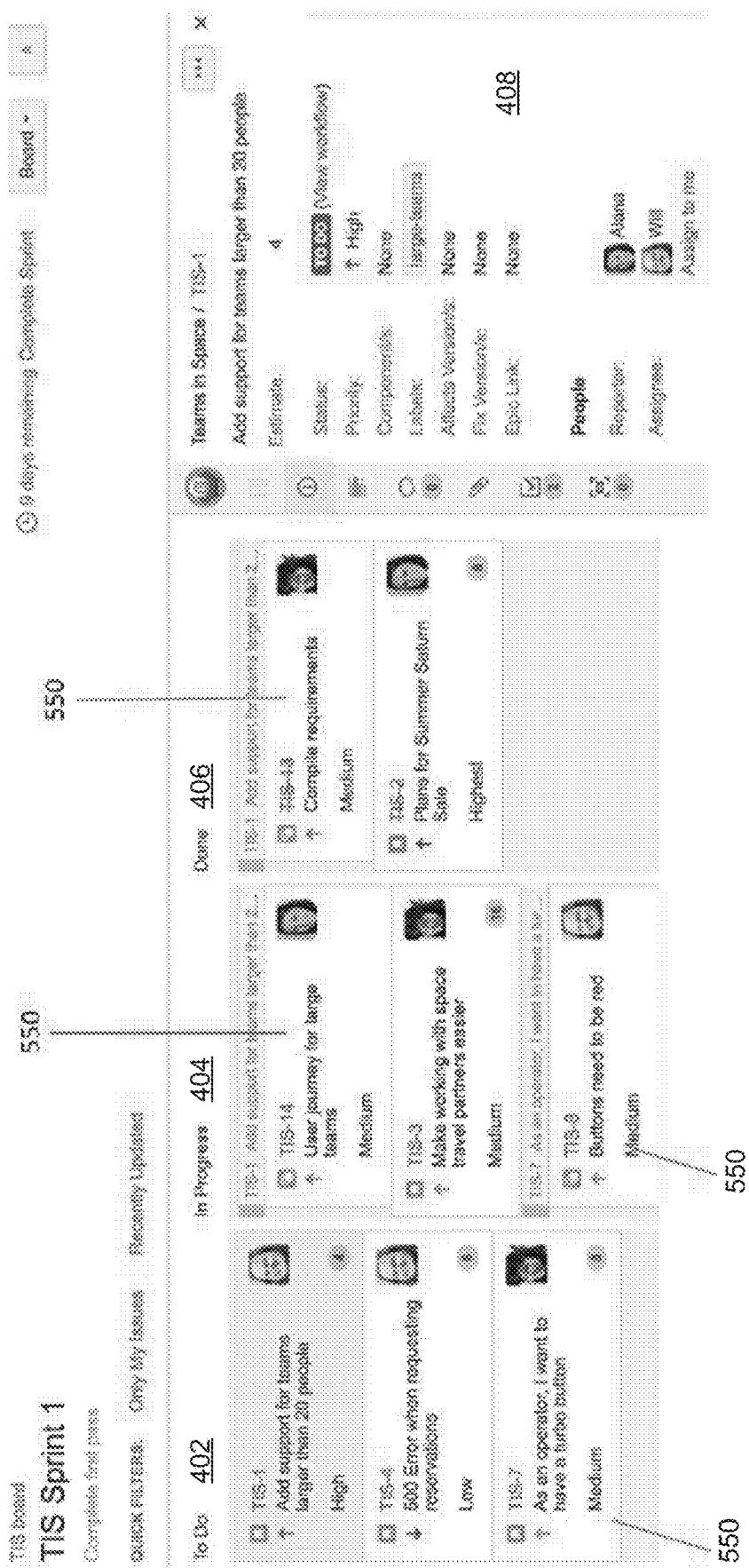

Such a workflow is illustrated in FIG. 4, in which the items in active sprint 302 are displayed as a series of cards 550 laid out in a grid-like form in rows and columns. The columns are illustratively labelled as 'To Do' 402, 'In progress' 404 and 'Done' 406 to reflect the current workflow status of each of the issues. In a similar manner to FIG. 3, additional information about a work item is displayed in detail area 408 when the item is selected.

5. Source Code Management System

As noted above, the present disclosure is concerned with integrations of an ITS with an SCM. An example of a SCM system in which features of the present disclosure may be implemented is Bitbucket, including Bitbucket Cloud and/or Bitbucket Server, which is commercially available from Atlassian. Bitbucket hosts Git and/or Mercurial repositories for enterprise and/or cloud users.

Git is a version control system used for software development and other version control tasks. A Git working directory is a repository that has complete history and revision tracking metadata and functions. In addition to hosting Git/Mercurial repositories, BitBucket® supports user authentication, repository security, and integration with existing databases and development systems, for use with a large number of users, hundreds of thousands of users, and repositories, millions of repositories.

In the description below, Git and Bitbucket are used as an example SCM system for illustrative purposes. It will be appreciated that the various feature and techniques described herein could, with appropriate modifications, be used with alternative SCM systems, e.g., Mercurial and Subversion.

Figure 5:
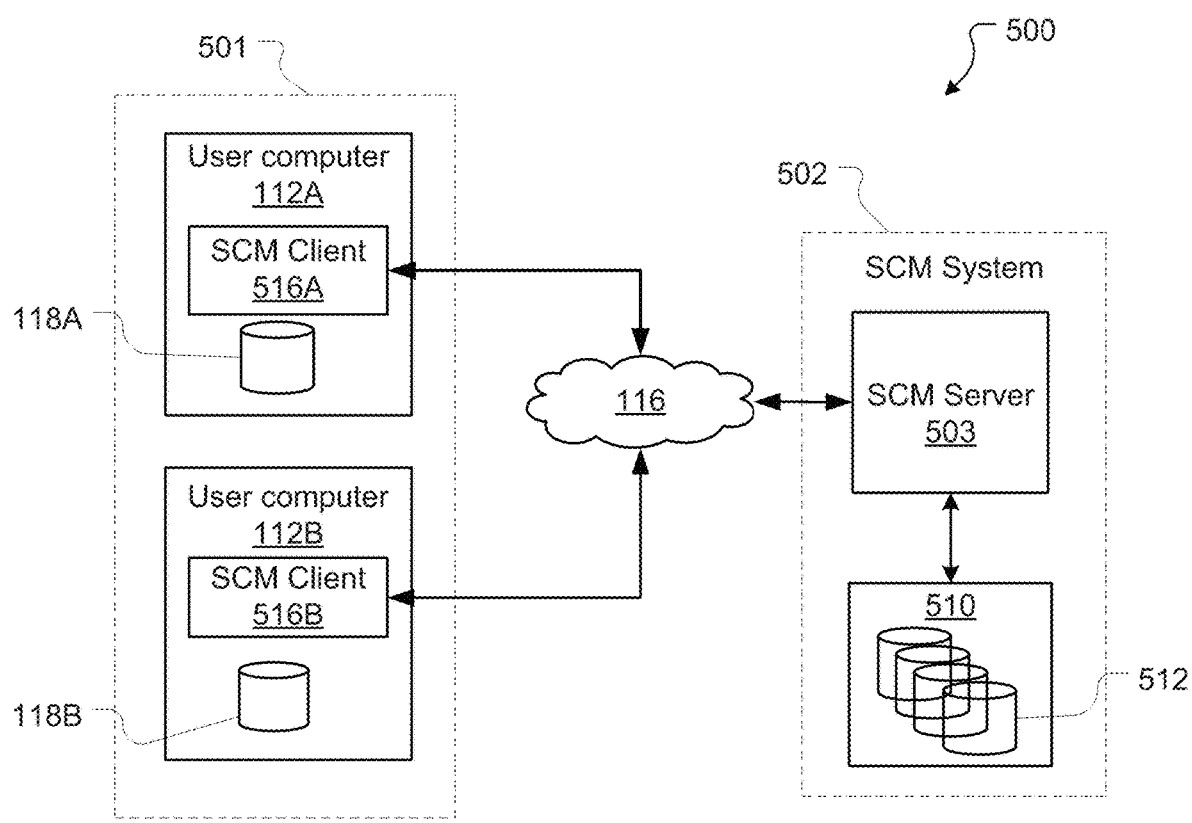
FIG. 5 illustrates a client server architecture for an SCM suitable for use with the present disclosure.

FIG. 5 illustrates an environment 500 in which aspects of the present disclosure are implemented. The environment 500 includes one or more user computers 112 and a SCM system 502 which communicate with each the user computers over one or more communication networks 508.

The SCM system 502 includes one or more SCM server(s) 503 and file storage server 510. The one or more SCM servers 503 receive/respond to client requests and communicate with the shared file server to retrieve/store data. In certain embodiments, the SCM system 502 is a scalable system including multiple distributed server nodes 503 connected to a shared file server 510. Depending on demand from user computers 112, and/or other performance requirements, server nodes 503 can be provisioned/de-provisioned on demand to increase/decrease the number of servers offered by the SCM system 502. Each distributed server node may run on a computer and includes one or more application programs, libraries, APIs or other software that implement server functionality.

The SCM system 502 stores SCM repositories 512 on the shared file server 510 and manages the content of those SCM repositories 512. Each SCM repository 512 may include various files, e.g. source code files, and associated file and/or repository metadata. Shared file server 510 may be a distributed system storing content over multiple shared file server nodes which can be provisioned/de-provisioned on demand based on the data storage requirements.

Each user computer 112 runs an SCM client 516, which configures the user computer 112 to perform client-side SCM operations. Each user computer 112 further includes a local memory 518 that stores local copies of one or more SCM repositories 512 on which the user is working, called the working copy.

The SCM client 516 is executed by a processor of the user computer 112 to perform various functions in order to bring about the occurrence of events. By way of example, some functions performed by the SCM client 516 include creating local repositories; modifying, adding or deleting files in the local repositories; committing/pushing changes made in the local repository to the SCM system 502, so that the files are written to the relevant SCM repository 512 in the shared file server 110; fetching, e.g. pulling, files from the shared file server 510 via SCM system 502; providing a user interface for reading/writing source code; etc.

The user computer 112 may be any suitable device, for example a desktop computer, a mobile device, e.g. a tablet or mobile phone, or a portable device, such as laptop computer. Only two client devices 112A and 112B running two SCM clients 516A and 516B have been illustrated, but normal operation of the SCM system 502 typically involves many more user computers connected to the SCM system 502 to access data from/write data to repositories 512.

Generally speaking, the user computers 112 communicate with the SCM system 102 to 'push' data, e.g. source code files, to a SCM repository 512, i.e., send any changes made to the locally stored files to the SCM system 502 for storage in the appropriate SCM repository 512, or 'pull' data from the SCM system 502 to be stored locally, i.e., fetch changes/files/repositories from the shared file server 510 to merge in the local database 518. The SCM system 502, in turn, is configured to receive pushed data from the client devices 501 and send requested data to the client devices.

During software development, common events occurring in a SCM repository 512 include, adopting Git terminology, commits, branches and pull requests. Other events occurring in a SCM repository are failed builds. Software developers are well aware of these actions/events, but a high-level description is provided for reference.

Generally speaking, a commit adds changed source code files to the SCM repository 512. Commits are usually kept in the SCM repository indefinitely. When users clone a repository, they will receive the latest committed versions of the source code files, unless they specify they wish to retrieve a previous version of the source code in the repository.

Pull requests are a mechanism for developers to notify team members that a particular feature has been completed. Once the feature branch is ready, the developer files a pull request via user computer 112. This serves as a notification to others that code is requiring review before it can be merged into the relevant branch of the repository.

A branch represents an independent line of development. Branches serve as an abstraction for the edit/stage/commit process and can be thought of as a way to request a new working directory, staging area, and project history. New commits are recorded in the history for the current branch, which results in a fork in the history of the project.

Similar to the ITS 100, communications between the user computers 112 and the SCM system 502 are via the communications network 508. For example, the user computer 112 may communicate with the SCM system 502 through a local area network (LAN) of an enterprise in one embodiment. In this case the SCM system 502 will be implemented as an on-premises solution in which the SCM system 502 and user computers are associated with the same business enterprise. In another embodiment, the network 508 may represent a public network and the SCM system 502 may be located off-premises with respect to the user computers, such as in a shared data center or cloud computing facility. Further, the communication may be facilitated by any appropriate transport protocol. For example, a Git SCM system supports secure shell (SSH), Hypertext Transfer Protocol (HTTP), Hypertext Transfer Protocol Secure (HTTPS), and Git transport protocols.

6. ITS/SCM System Communications

In software development projects, an ITS 100 and an SCM 502 may be used in conjunction. For example, an issue defined in the ITS 100 may relate to a particular feature that is under development for a software product. The source code for the software product being developed is maintained in a particular SCM repository 512 and potentially in a particular branch of that repository. In such cases, there are advantages to associating issues with relevant SCM repositories and, using that association, providing development status information via the ITS 100. By doing so users are provided with additional relevant information in respect of issues directly from the ITS 100; that is to say without having to leave the ITS 100, access the SCM system 500, and obtain the information from there.

One way of associating issues maintained by an ITS 100 with an SCM system 502, is by use of issue identifiers or keys. As noted above, each issue maintained in an ITS 100 is provided with a unique issue identifier. This issue identifier can readily be associated or linked with SCM actions or events that are relevant to the issue. For example, the ITS issue key can be included in a branch name, a commit message, a pull request, and/or other relevant ITS events.

When a SCM action/event associated with a particular issue occurs, the SCM system 500 is configured to make information in respect of the event available to the ITS 100. This can be achieved in a number of different ways. As one example, and in certain embodiments, SCM system 500 is configured to use webhooks that are triggered when an ITS issue key is associated with an SCM action or event. The webhooks are designed to notify the ITS by way of an HTTP request to a suitable URL endpoint of the association and provide the ITS with details of the specific SCM action/event. Correspondingly, ITS 100 is configured to listen for communications arriving on the designated URL and store the provided information in the particular project referenced by the ITS key.

Figure 6:
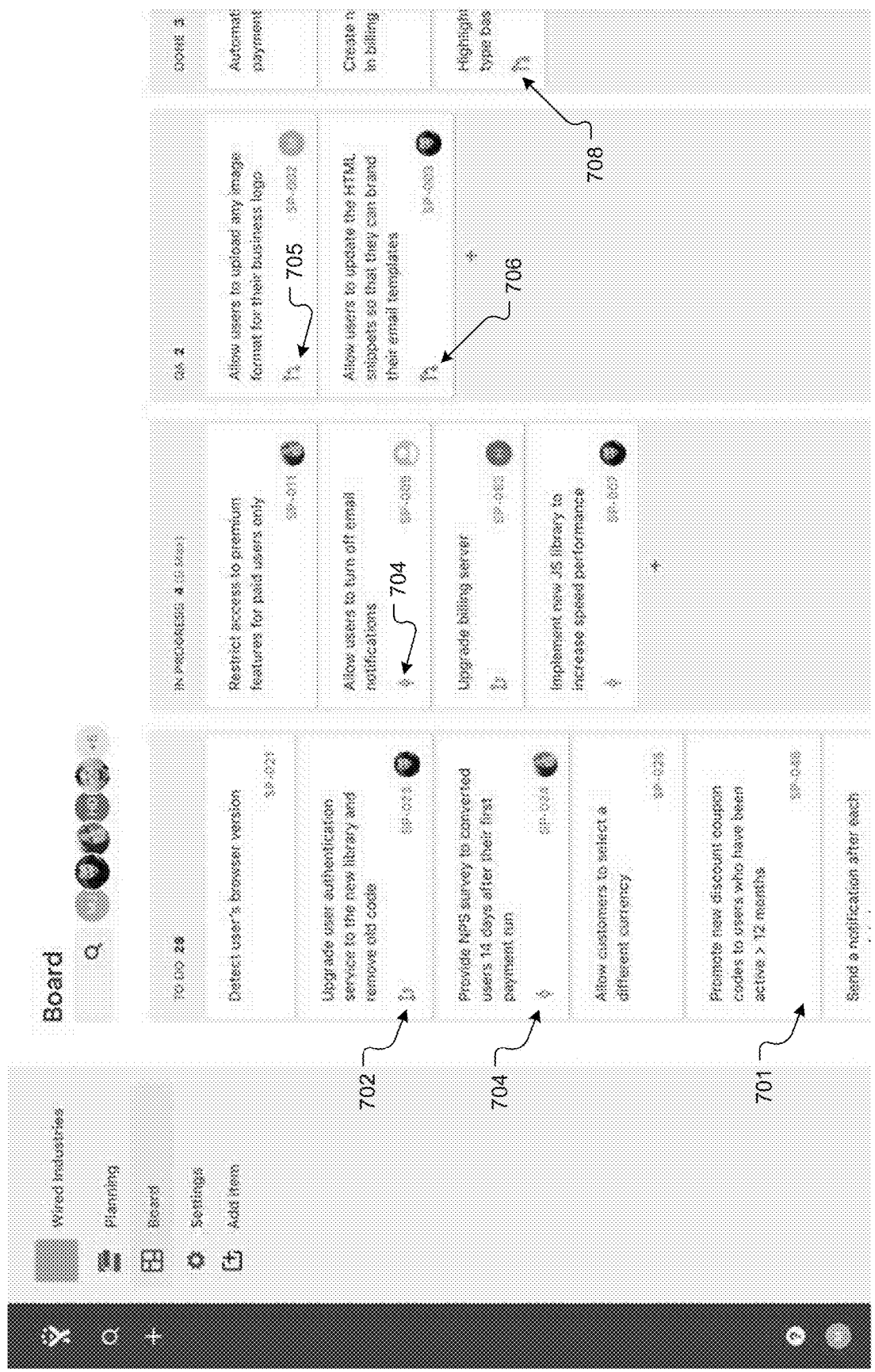
FIGS. 6 to 9 illustrate examples of user interfaces generated by an integrated ITS and SCM in accordance with the present disclosure.

FIG. 6 illustrates an example of in ITS user interface generated after the receipt of information from an SCM 500 pertaining to events and actions occurring in the SCM's repositories. ITS issues are displayed in a grid of cards similar to that shown in FIG. 4. In FIG. 6, however, for issues that are linked to SCM repository events, i.e. as informed by the SCM system 500, a development status indicator is also displayed. This indicator serves to provide users with development status information in respect of the issue. In the present embodiment, the development status indicators are icons showing different development events that have occurred in the SCM repository, including an icon for branches 702, commits 704, open pull requests (grey) 705, declined pull requests (red) 706 and merged pull requests (green) 708. Alternative development status indicators may be used for these events, and indicators showing additional events may also be used.

The display of the development status indicators can occur contemporaneously or shortly after the Board and its constituent cards are rendered. In instances of non-contemporaneous display, it is preferred that cards with development status indicators are updated together by way of a smooth fade-in effect or the like.

Further detail about a given issue and any linked SCM repository events can be obtained by clicking on the card 550 for that issue. This causes the ITS 100 to display an issue detail window/interface FIGS. 7 and 7A. In certain embodiments, and with a view to improving readability and integration between the SCM 502 and ITS 100, ITS 100 uses the same icons that are used by the SCM system 502. In other words, whatever visual indicator is used by the SCM system 502 to indicate, for example, a commit, is the same visual indicator used by the ITS 100 to indicate a commit.

Figure 7:
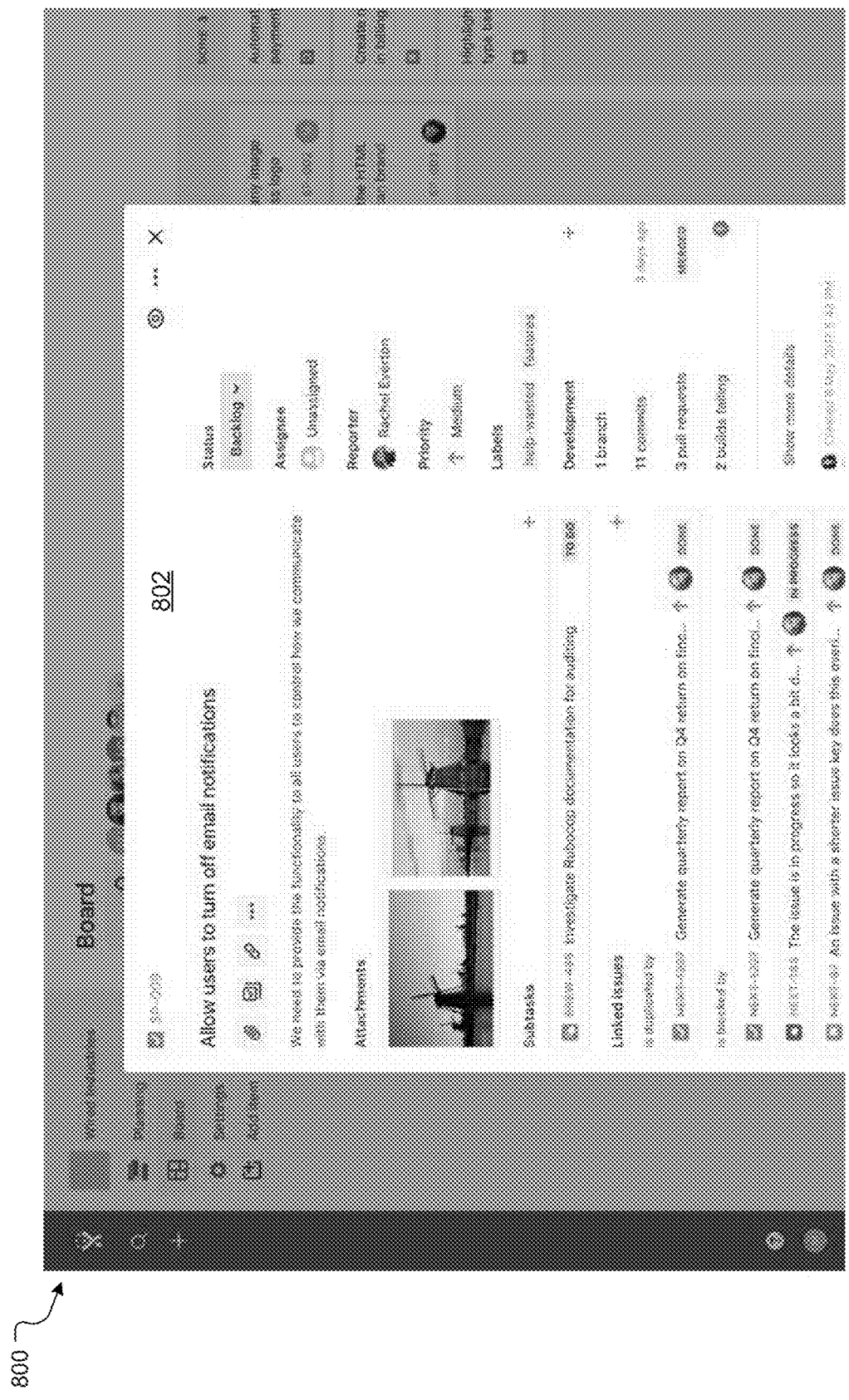
Figure 7A:
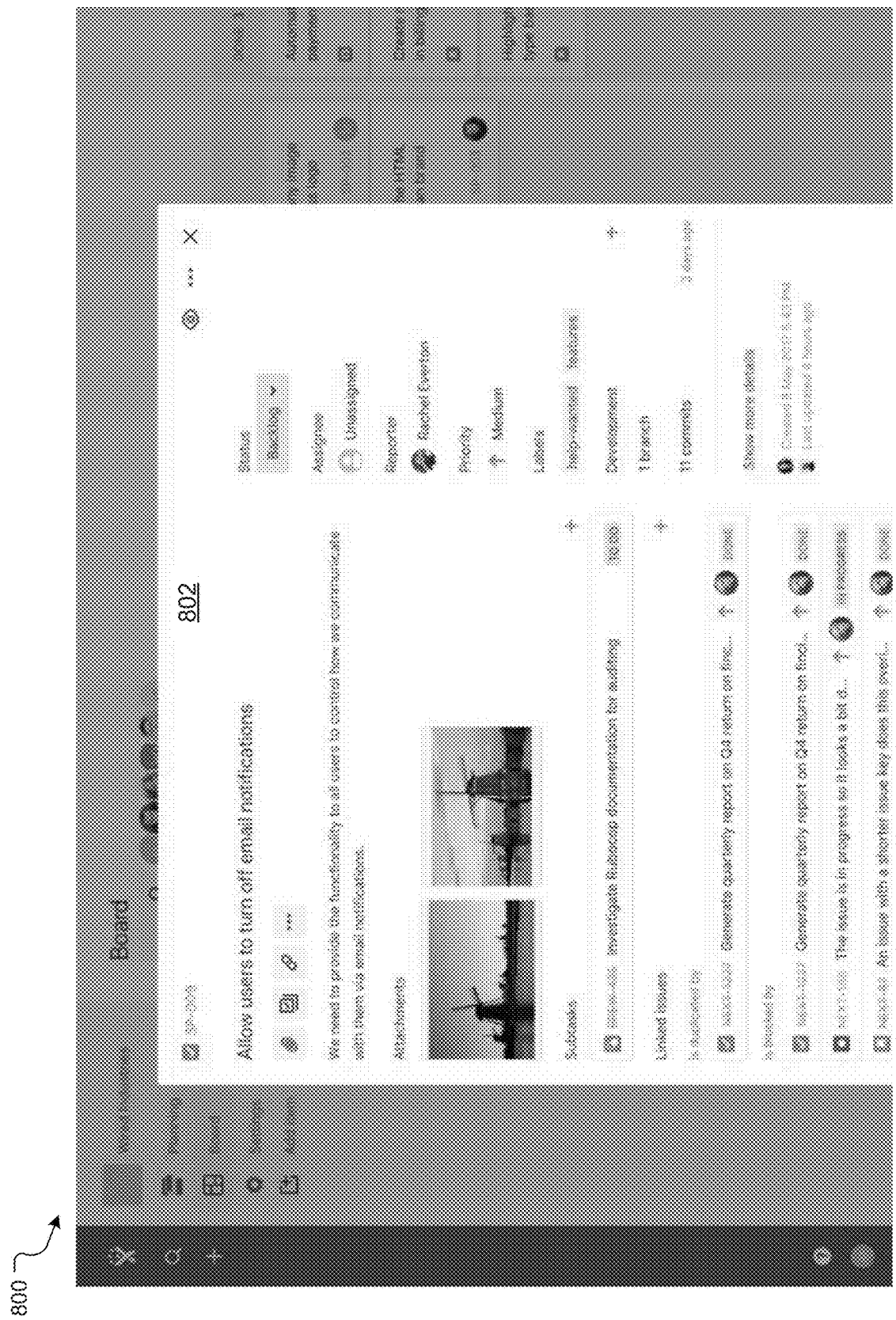

FIG. 7 depicts an ITS 100 interface 800 in which a user has selected a particular issue, issue SP009 in this case, and additional issue detail is shown in an issue detail section 802. It will be apparent from the issue detail 802 that a given issue may be associated with multiple SCM repository events or actions, and that those events are divided up into different categories. In this particular example the categories and events are: branches (1 branch), commits (11 commits), pull requests (3 pull requests) and failed builds (2 builds failing). FIG. 7A provides an alternative example, showing SCM repository events/actions that are associated with the issue, namely: branches (1 branch), and commits (11 commits).

Returning to FIG. 6, it can be seen that although issue SP009 has multiple SCM repository events associated with it, only the development status icon for a commit 704 is shown on the issue card SP009.

Owing to the limited display area in each card, embodiments described herein take the approach of applying a display methodology to an issue's linked SCM repository events. Typically, the display methodology is applied to the data received from the SCM system 500, and involves processing the data to generate an order for the SCM-repository events to which the data relates. In turn, when it comes to displaying the SCM-repository event information in the ITS interface 700 (FIG. 6), the information is selectively displayed in accordance with the generated order. In other words, only selected events that are at or near to the top of the order are displayed in the relevant cards 701 of the ITS interface 700. In the illustrated embodiments, only the SCM event determined to be the most important event, i.e. the event at the top of the order, is displayed. Displaying one and only one development status indicator on cards which depict issues with corresponding SCM events improves the instant readability of the board without overwhelming users with too much information. In other embodiments additional development status indicators could be displayed, e.g. development status indicators for the top n SCM events in the generated order.

In certain embodiments, the display methodology applied where an issue has multiple SCM-repository events is an order of importance that is programmed into the ITS. The order of importance can be determined against any suitable criteria, such as the relative order of importance of the individual SCM repository events according to the SCM System 502. For example, the order of importance for issue SSP-009 illustrated in FIGS. 6 and 7A in ascending order is branches, commits, open pull requests, declined pull requests, merged pull requests.

Commits are superior to branches in the order, and accordingly only the 'commit' development status indicator 704 is displayed in the issue's card in the top-level Board view in FIG. 6.

This approach of ordering SCM repository events prior to display, allows information to be surfaced by exception and at specific/relevant times when a developer needs to be aware of important information that may be preventing work from proceeding.

The ITS Interface illustrated in FIG. 6 can be further configured to provide additional information about the underlying SCM-repository event for which a development status indicator is displayed. Preferably, such additional information is displayed in such a manner as to minimize the amount of 'clutter' on the ITS Interface. One display strategy involves providing user interface elements that are displayed in response to a user 'hovering' the mouse over the display status indictor. The display of the user interface element is ceased after the mouse moves away from the vicinity of the display status indicator.

Figure 8:
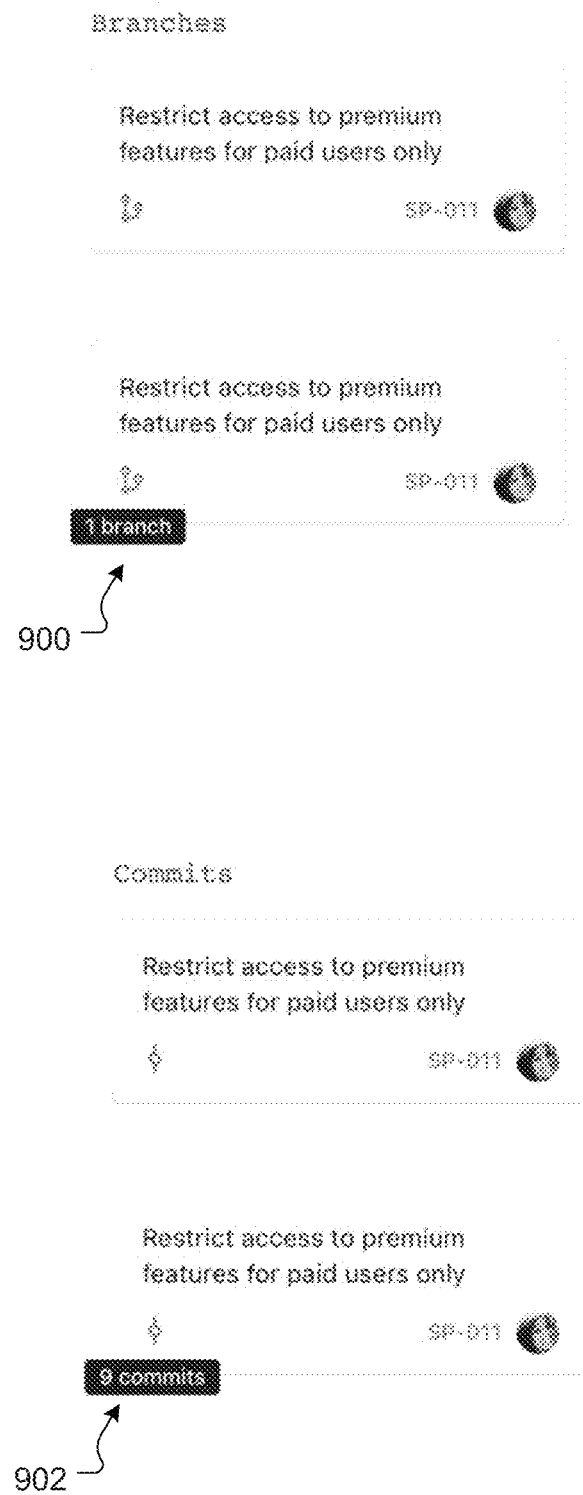
Figure 9:
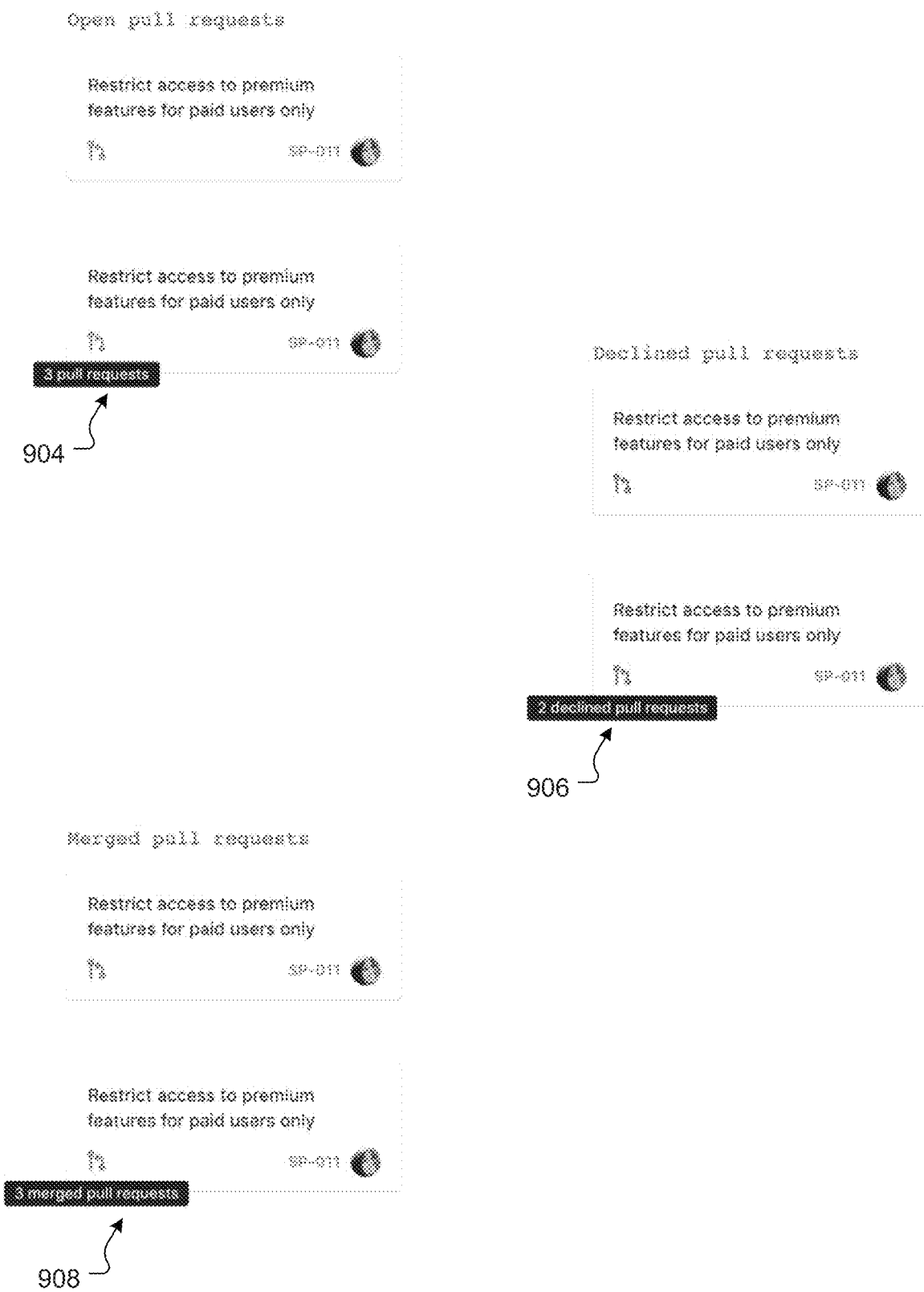

FIGS. 8 and 9 illustrate examples of hover-triggered user interface elements for each of the development status indicators shown in the ITS Interface of FIG. 6. In each case, the user interface element displays the number of underlying SCM-repository events to which the development status indicator refers. More specifically, the issue shown in FIG. 8 is linked to 1 branch 900 and 9 commits 902. Similarly, the issue shown in FIG. 9 is linked to 3 open pull requests 904, 2 declined pull requests 906 and 3 merged pull requests.

By providing development statuses on cards in this way, potential problems and/or pending actions that need to be addressed before the relevant work can be completed are highlighted. Furthermore, developers can better understand what status their work is in on the board, so that they can quickly decide what to do next to progress the work forward.

5. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
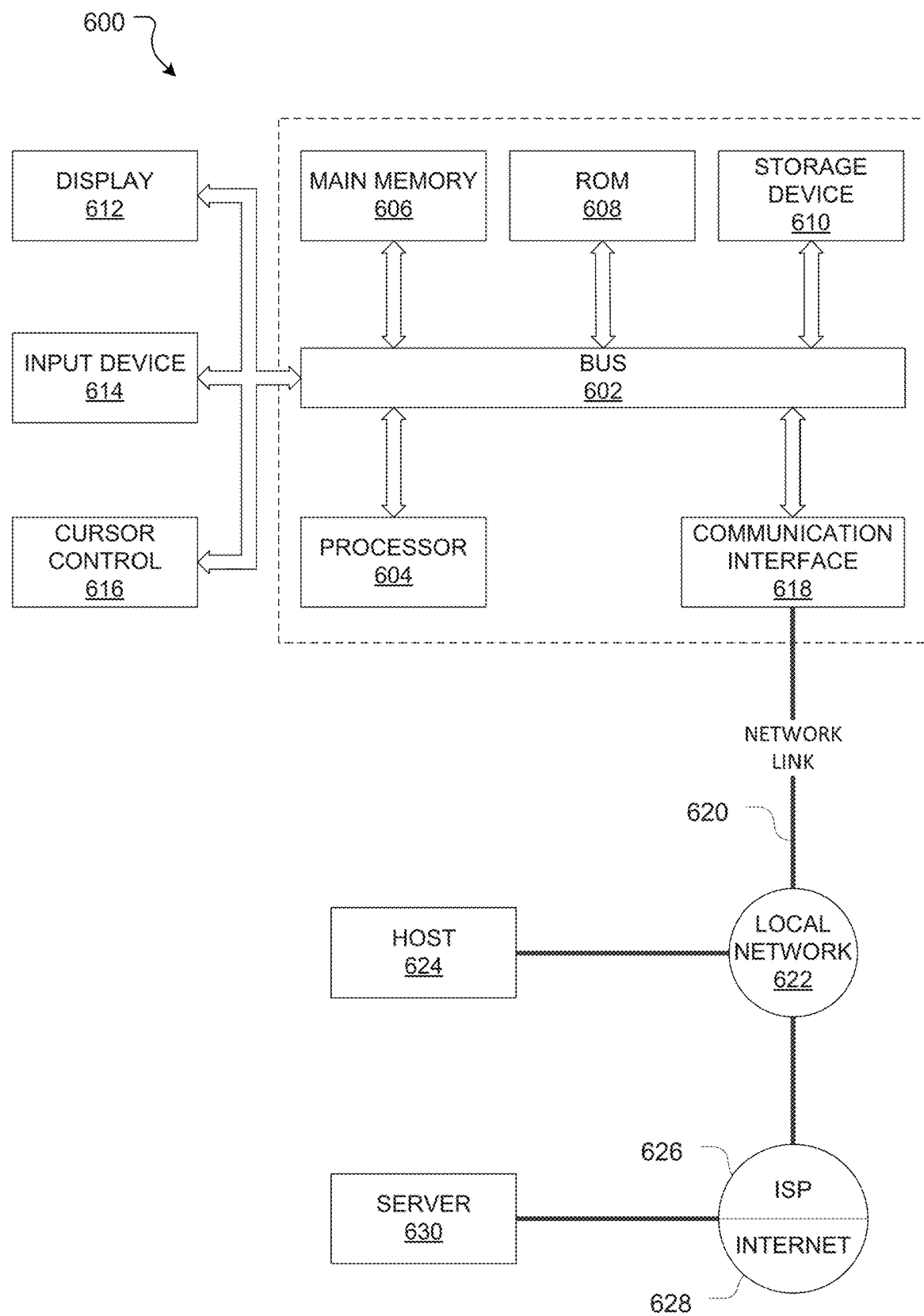
FIG. 10 illustrates a computer system which may be used to implement various embodiments.

For example, FIG. 10 is a block diagram that illustrates a computer system 600 upon which embodiments may be implemented. Server computer 102 and/or user computer 112 may be computer systems such as 600.

Computer system 600 includes a bus 602 or other communication mechanism for communicating information, and a hardware processor 604 coupled with bus 602 for processing information. Hardware processor 604 may be, for example, a general-purpose microprocessor.

Computer system 600 also includes a main memory 606, such as a random-access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to one or more output devices such as a display 612 for displaying information to a computer user. Display 612 may, for example, be a cathode ray tube (CRT), a liquid crystal display (LCD), a light emitting diode (LED display), or a touch screen display. An input device 614, including alphanumeric and other keys, may be coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. Additional and/or alternative input devices are possible, for example touch screen displays.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

A computer system as described herein may be configured in a plurality of useful arrangements. In one approach, a data processing method comprises using a server computer, obtaining from one or more non-transitory computer-readable data storage media a copy of one or more sequences of instructions that are stored on the media and which when executed using a particular user computer among a plurality of user computers cause the particular user computer to perform, using the particular user computer alone or in combination with the server computer, the techniques that are described herein; and using the server computer, downloading the copy of the one or more sequences of instructions to any user computer among the plurality of user computers.

In another approach, a computer system comprises a server computer comprising one or more non-transitory computer-readable data storage media stored with one or more sequences of instructions which when executed using a particular user computer among a plurality of user computers cause the particular user computer to perform: using the particular user computer, alone or in combination with the server computer, the techniques that are described herein; and in the server computer, stored downloading instructions which, when executed using the server computer, cause downloading a plurality of copies of the one or more sequences of instructions to the plurality of user computers.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

It will be understood that the embodiments disclosed and defined in this specification extend to all alternative combinations of two or more of the individual features mentioned or evident from the text or drawings. All of these different combinations constitute various alternative aspects of the embodiments.

What is claimed is:

1. A method for interfacing between an issue tracking system (ITS) and a source code management system (SCM), the method comprising the steps of:
    creating a link between an issue of a plurality of issues of the ITS and one or more repository events of the SCM;
    receiving from the SCM, data pertaining to linked repository events;
    processing the received data to generate an order for the repository events to which the issue is linked;
    concurrently displaying the plurality of issues, each issue of the plurality of issues being displayed with issue information and issues having linked SCM-repository events being displayed with linked repository event information;
    displaying, for the issue of the plurality of issues, a development status indicator that corresponds to a SCM-repository event that is selected based on the order of the SCM-repository events to which the issue is linked;
    in response to a user interaction with the development status indicator, displaying a numerical value that indicates a quantity of SCM repository events to which the development status indicator refers;
    wherein the display of the plurality of issues displays a single issue on a card and concurrently displays the plurality of issues as a plurality of cards laid out in a grid-like pattern that includes one or more columns of cards, each column relating to an issue category.

2. The method of claim 1, wherein the order is generated according to an order of importance of the SCM-repository events within the SCM.

3. The method of claim 1, wherein the SCM-repository events include one or more: commits, branches; open pull requests; declined pull requests, and merged pull requests.

4. The method of claim 3, wherein pull requests are superior in the order to branches and commits.

5. An issue tracking system (ITS) comprising:
    one or more processors;
    one or more non-transitory computer-readable storage media storing sequences of instructions which, when executed by the one or more processors, cause the one or more processors to:
    render a user interface configured to receive user input defining one or more issues;
    interface with a source code management system (SCM) and create a link between an issue of a plurality of issues and one or more SCM-repository events;
    receive from the SCM, data pertaining to linked SCM-repository events;
    process the received data to generate an order for the SCM-repository events to which the issue is linked;
    concurrently display the plurality of issues, each issue of the plurality of issues being displayed with issue information and issues having linked SCM-repository events being displayed with linked SCM-repository event information;
    display, for the issue of the plurality of issues, a development status indicator that corresponds to a SCM-repository event that is selected based on the order of the SCM-repository events to which the issue is linked;
    in response to a user interaction with the development status indicator, display a numerical value that indicates a quantity of SCM repository events to which the development status indicator refers;
    wherein the display of the plurality of issues displays a single issue on a card and concurrently displays the plurality of issues as a plurality of cards laid out in a grid-like pattern that includes one or more columns of cards, each column relating to an issue category.

6. The ITS of claim 5, wherein the order is generated according to an order of importance of the SCM-repository events within the SCM.

7. The ITS of claim 5, wherein the SCM-repository events include one or more: commits, branches; open pull requests; declined pull requests, and merged pull requests.

8. The ITS of claim 7, wherein pull requests are superior in the order to branches and commits.

* * * * *